United States Patent Office 3,352,932
Patented Nov. 14, 1967

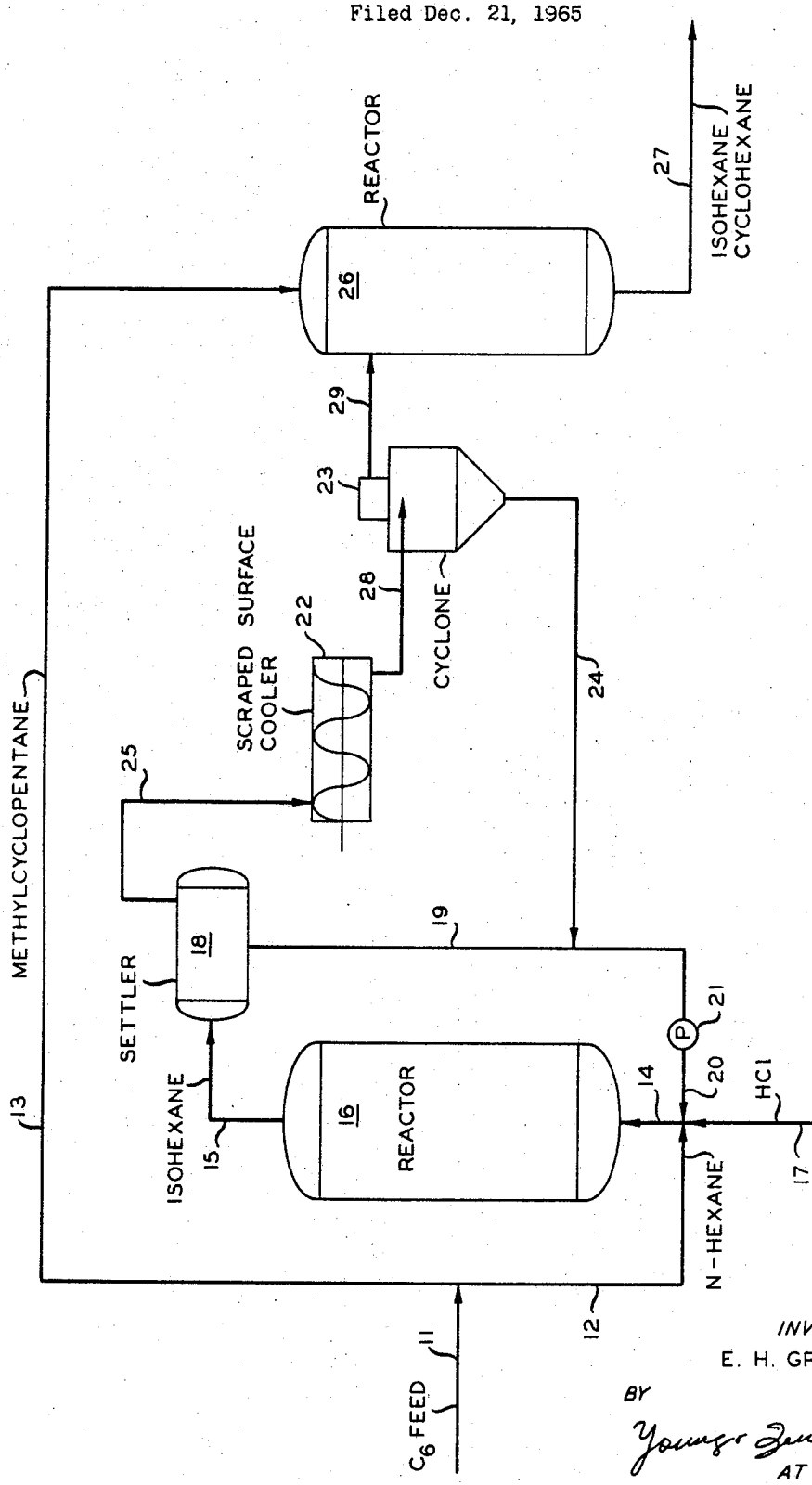

3,352,932
TWO-STAGE ISOMERIZATION
Earl H. Gray, Bartlesville, Okla., assignor to Phillips Petroleum Company, a corporation of Delaware
Filed Dec. 21, 1965, Ser. No. 515,331
7 Claims. (Cl. 260—666)

ABSTRACT OF THE DISCLOSURE

A first isomerizable compound is contacted with a catalyst under conditions suitable to effect isomerization. The catalyst is substantially separated from the resulting isomerizate. This isomerizate, containing residual catalyst, is contacted with a second isomerizable compound under conditions whereby the second compound is isomerized.

---

This invention relates to isomerization. In one aspect, it relates to the isomerization of isomerizable compound by contacting it with a solution of isomerization catalyst in the isomerizate formed by isomerization of a different isomerizable compound. In another aspect, it relates to a process for two-stage isomerization comprising isomerizing a first isomerizable compound in the presence of a catalyst, substantially separating the catalyst from the isomerizate and subsequently isomerizing a second isomerizable compound by contacting with the first formed isomerizate containing a small amount of residual dissolved isomerization catalyst. In another aspect, it relates to a method of isomerizing two compounds which are most efficiently isomerized at different temperature conditions by isomerizing one compound at a first temperature in the presence of a catalyst, and subsequently contacting the second compound with the isomerizate first formed, and containing dissolved catalyst, at a second temperature. In still another aspect, this invention relates to a method of isomerizing n-hexane and methylcyclopentane by first isomerizing n-hexane in the presence of a catalyst under conditions suitable for the maximum isomerization of the n-hexane, substantially separating the isomerization catalyst from the resulting isomerizate, and contacting this isomerizate containing residual dissolved catalyst with the methylcyclopentane under conditions suitable for the maximum isomerization of the methylcyclopentane.

In the separation of hydrocarbon fractions from natural and straight run gasolines, the $C_6$ fraction, containing the normal hexane and methylcyclopentane, is frequently isomerized to produce the more valuable components of isohexane and cyclohexane, respectively. This isomerization is normally conducted in the presence of a metal halide-hydrocarbon complex catalyst, such as hydrogen chloride-activated aluminum chloride complex. Although both n-hexane and methylcyclopentane may be isomerized simultaneously in a single reaction vessel, it is known that the two compounds are more advantageously isomerized separately to take advantage of the different temperature ranges which beneficially affect the equilibrium constant of the two reactions. It has been proposed that the stream containing n-hexane and methylcyclopentane be fractionated, and each component isomerized in separate reactors under the most desirable temperature conditions for each reaction, and the resultant isohexane and cyclohexane be rejoined to form the final product if desired to form a blending agent for high quality motor fuels. Another known method of isomerizing these two compounds is disclosed in Patent No. 3,054,832, issued Sept. 18, 1962, and comprises reacting a stream containing methylcyclopentane and hexane in a first isomerization zone at a relatively high temperature, and subsequently in a lower temperature zone for a shorter period of time.

It is an object of this invention to provide a new method for the isomerization of n-hexane and methylcyclopentane-containing streams. It is a further object of this invention to reduce the soluble catalyst losses in an isomerization process. It is still another object of this invention to increase the reactor residence time in the isomerization of a difficultly isomerizable substance in a stream comprising this substance in combination with a more readily isomerizable substance. It is a still further object of this invention to isomerize a readily isomerizable compound by contacting it with an isomerization catalyst dissolved in the isomerizate formed in the isomerization of a difficultly isomerizable compound.

According to the invention, a first isomerizable compound is isomerized in the presence of a catalyst, the catalyst is substantially separated from the resulting isomerizate, and the said isomerizate containing residual dissolved catalyst is contacted with a second isomerizable compound whereby the second compound is isomerized.

The operation of my invention, as well as the other aspects, objects, and advantages will become apparent by reference to the drawing. A feed stream containing the $C_6$ hydrocarbons, n-hexane and methylcyclopentane, is introduced through line 11 and fractionated to obtain substantially pure compounds in lines 12 and 13. If other components are present in the feed stream, additional fractionation may be necessary to separate and remove impurities from this process. It is additionally within the contemplation of this invention to introduce separate feed streams of n-hexane and methylcyclopentane to the process from other independent sources. n-Hexane is introduced through line 14 to reactor 16, where it is catalytically isomerized to form isohexane. Any isomerization catalyst may be used, but an aluminum chloride-hydrocarbon complex catalyst will find most general application. Hydrogen chloride activator for this catalyst is introduced through line 17. The isomerizate from reactor 16 is introduced by line 15 to settler 18 where the major portion of the catalyst complex is separated from the hydrocarbon material. This separated catalyst complex is returned to the reactor through lines 19, 20, and 14, by action of pump 21. The hydrocarbon stream from the settler, still containing dissolved and entrained aluminum chloride complex catalyst, is conducted by line 25 to scraped surface cooler 22 where it is chilled to reduce solubility of the aluminum chloride complex in the isohexane. It is then conducted by line 28 to cyclone 23 where separation of the precipitated aluminum chloride complex from the isohexane occurs. The catalyst may be returned to the reactor through line 24. The purified isohexane, now containing only a small residual amount of dissolved isomerization catalyst, is introduced by line 29 to reactor 26. The methylcyclopentane, at the temperature desired, is also introduced to this reactor through line 13. Cooler 22 is maintained at a temperature such that the quantity of dissolved aluminum chloride present in the isohexane is sufficient to completely isomerize the methylcyclopentane to form cyclohexane in reactor 26. The final product stream of the process, containing isohexane and cyclohexane, is removed from reactor 26 through line 27 to further processing as desired.

The catalysts employed in carrying out said isomerization comprise metal halides, such as aluminum chloride, aluminum bromide, boron trifluoride and the halides of such metals as zinc, tin, arsenic, antimony, zirconium, beryllium, titanium, iron, and the like. These catalysts are especially effective when present as complexes which are formed by interaction between the metal halides and hydrocarbons present in the reaction system. A particularly desirable isomerization catalyst is the complex of hydrocarbon with aluminum chloride. In addition to the catalyst it is desirable that the corresponding hydrogen halide be present in the reaction zone since this material maintains catalyst activity at a high level. The reaction rate and the conversion of the hydrocarbon feed is dependent on the amount of aluminum chloride in the aluminum chloride-hydrocarbon complex. Thus, to maintain a normal hexane conversion of about 55 percent, the catalyst complex should contain 60 to 62 percent aluminum chloride. However, the quantity of aluminum chloride in the complex can be varied over wide ranges to provide a corresponding range of feed reactant conversion. While the over-all activity of the catalyst is established by the aluminum chloride content, as stated, the presence of hydrogen chloride is required to provide a high activity. Usually the quantity of hydrogen chloride present is between about 2 and about 6 weight percent of the feed with about 4 weight percent being preferred. The hydrocarbon-to-catalyst ratio is also an important factor in the isomerization reaction rate and generally this ratio is maintained between about 0.8:1 and about 1.4:1 although ratios as high as 5 to 1 can be used if reaction temperatures are increased.

The aluminum chloride-hydrocarbon complex catalyst most commonly employed can be originally prepared by mixing aluminum chloride and kerosene or other hydrocarbon material in a weight ratio of about 8 to 5. During operation of the process, the original complex catalyst is replaced with complex catalyst formed in the process and which contains aluminum chloride and hydrocarbon in a weight ratio of about 1 to 1. Some of the catalyst will be lost through solution in the product stream, and will have to be replaced during the process. This is conveniently accomplished by adding additional catalyst to the feed stream to the reactor.

The n-hexane is conveniently isomerized in reactor 16 at a temperature between about 90 and about 180° F., and under sufficient pressure to maintain the reaction mixture in liquid phase. The residence time of the n-hexane in the reactor may vary in accordance with the temperature being used to obtain the maximum isomerization. In general, normal residence times are between 0.1 and 5 hours, preferably about 0.9 hour.

The methylcyclopentane can be isomerized in reactor 26 at a temperature from about 70 to about 180° F., and residence time may be varied in accordance with the temperature used to obtain maximum isomerization of this step as well, within the range of 0.05 to 0.5 hour, preferably about 0.3 hour.

The scraped surface cooler 22 and cyclone separator 23 as shown in the drawing are optional and may be omitted provided that the desired temperature of reactor 26 be achieved by lowering the temperature of effluent 25 from settler 18 by other means, such as by cooling substantially the feed stream 13 rich in methylcyclopentane and/or by cooling the reactor 26 itself. Omission of the scraped surface cooler and cyclone will, of course, result in somewhat greater inclusion of catalyst by solution in stream 29 and ultimately greater loss in product stream 27, and thus create problems in downstream equipment of corrosion and deposition even though caustic washing, decantation and coalescing of water-soluble compounds are employed.

By the practice of this invention, the isomerization of normal hexane is conducted at optimum temperatures, catalyst complex-to-hydrocarbon ratios and reactor residence times. Soluble catalyst complex present in settler effluent 25 may be reduced in concentration by cooler 22 and separator 23 to that level barely capable of reacting the added methylcyclopentane, stream 13. If desired, stream 13 may be heated or cooled to achieve a temperature in vessel 26 which will produce optimum reaction conditions for methylcyclopentane. Thus, the temperature in reactor 26 can be maintained independently of the temperature employed in cooler 22 for the separation of dissolved catalyst.

It will, of course, be apparent to one skilled in the art that the location of reactor 26 with respect to cooler 22 and separator 23 may be changed to achieve different reaction temperatures and catalyst concentrations. Location of reactor 26 on line 25 between settler 18 and cooler 22 will increase catalyst concentration therein, since all entrained and soluble catalyst complex will be available to catalyze the reaction of methylcyclopentane to cyclohexane. Substantial cooling of stream 13 will then be required to reduce the reaction temperature in vessel 26 since the benefit of cooler 22 thereto is lost. However, because of the dilution due to the addition of stream 13, a greater loss of dissolved catalyst through cooler 22 and separator 23 into the now product line 29 will be suffered. Likewise, the location of reactor 26 on line 28 between cooler 22 and separator 23 will cause increased catalyst losses due to resolution of precipitated-but-entrained catalyst in the added stream 13. The economy of utilizing the cooling in cooler 22 as well as that of feed stream 13 to lower the temperature of reactor 26 below that of reactor 16 will however be appreciated by one skilled in the art.

*Example*

A $C_6$ feed stream was fractionated to provide a normal hexane stream of 1790 bbls./day and a methylcyclopentane stream of 1230 bbls./day. The normal hexane stream was isomerized in a 6800 gallon continuous stirred reactor in the presence of aluminum chloride-hydrocarbon complex catalyst at a temperature of 157° F. and a pressure of 160 lbs./sq. in. gage. The isomerizate was conducted to a 7000 gallon settler where substantially all of the catalyst phase was separated, for subsequent return at a rate of 2670 bbls./day to the isomerization reactor, wherein a catalyst to hydrocarbon volume ratio of 1.49:1 existed. The separated isomerizate was cooled to a temperature of 86° F., thus precipitating aluminum chloride from a concentration of 2268 parts per million to a concentration of 120 parts per million. This isohexanes stream, containing the reduced concentration of aluminum chloride, was introduced to a 2000 gallon stirred tank reactor where it was contacted with the methylcyclopentane stream at a reaction temperature of 100° F. The effluent stream 27 from this second reactor comprised:

Component:
Isohexane _____ bbls./day effluent __ 1203
Cyclohexane _____ do ____ 998
n-Hexane _____ do ____ 586
Methylcyclopentane _____ do ____ 200
Aluminum chloride complex _____ p.p.m __ 71

In this example, average residence time of the normal hexane stream in the first isomerization reactor was calculated to be 52 minutes (0.87 hour), and the average residence time of the methylcyclopentane stream in the second isomerization reactor was calculated to be 23 minutes (0.38 hour).

In prior art operations, in which both the normal hexane and the methylcyclopentane streams were fed to a 8800 gallon reactor and isomerized by the above catalyst to hydrocarbon ratio (1.49:1) at a temperature of 157° F., the process effluent stream 25 comprised:

Component: Effluent
Isohexanes _____ b./d __ 1172
Cyclohexane _____ b./d __ 901
n-Hexane _____ b./d __ 617
Methylcyclopentane _____ b./d __ 302
Aluminum chloride complex _____ p.p.m __ 2268

Thus it can be seen that by the practice of this invention, I achieve an increased production of 31 b./d. of isohexanes and 97 b./d. of cyclohexane. While it is believed that the increase in isohexanes production is due to the greater residence time available, by means of the invention, for normal hexane conversion, the greatest improvement in the process economy results from the close approach to a more favorable equilibrium between cyclohexane and methylcyclopentane at the lowered, second reactor, temperature. While some discrepancy appears in the relative volumes of cyclohexane and methylcyclopentane in the above two effluent streams, it will be understood by one skilled in the art that volume yields are influenced by the relative densities of the components involved.

In addition to the above advantages created by the separated isomerizations at more nearly optimum temperature levels and residence times, I reduce the catalyst loss, and the consequent expense of its removal from the hydrocarbon product to 3.1 percent of the prior art practice.

Reasonable variations and modification are possible within the scope of the foregoing disclosure, the drawing, and the appended claims to the invention, the essence of which is that a compound is isomerized by contacting it with a solution of an isomerization catalyst in the product formed by isomerization of a different isomerizable compound.

I claim:

1. Process of isomerization comprising contacting a first isomerizable compound, n-hexane, with an isomerization catalyst for a period of time sufficient to effect isomerization of said first compound, substantially separating said catalyst from the resultant isomerizate, and contacting said resultant isomerizate containing residual catalyst with a second isomerizable compound, methylcyclopentane, under conditions whereby said second compound is isomerized.

2. Process of claim 1 wherein said substantial separation of said catalyst is accomplished by chilling said isomerizate and physically separating resultant precipitated catalyst therefrom.

3. Process of claim 1 wherein said catalyst is hydrogen chloride activated aluminum chloride.

4. Process of claim 3 wherein said n-hexane is isomerized at a temperature of about 90° F. to about 180° F. and said methylcyclopentane is isomerized at a temperature from about 70° to about 180° F.

5. Process of claim 3 wherein said n-hexane is isomerized at a temperature of about 157° F., the resultant isomerizate is chilled to a temperature of about 86° F., and said methylcyclopentane is isomerized at a temperature of about 100° F.

6. Process of claim 5 wherein said chilling is effective to reduce the catalyst concentration in said isomerizate to about 120 parts per million.

7. Process of claim 1 wherein said n-hexane and said methylcyclopentane are obtained by fractionation of a feed stream containing same.

References Cited

UNITED STATES PATENTS 3,054,832  9/1962  Cabbage _____ 260—666

DELBERT E. GANTZ, Primary Examiner.

V. O'KEEFE, Assistant Examiner.